United States Patent
Sherlock

(10) Patent No.: US 12,304,423 B2
(45) Date of Patent: May 20, 2025

(54) REMOTE START SYSTEM AND METHOD FOR A WORK MACHINE

(71) Applicant: Deere & Company, Moline, IL (US)

(72) Inventor: Lance R. Sherlock, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 273 days.

(21) Appl. No.: 17/648,358

(22) Filed: Jan. 19, 2022

(65) Prior Publication Data

US 2023/0226999 A1 Jul. 20, 2023

(51) Int. Cl.
*B60R 25/34* (2013.01)
*B60R 25/102* (2013.01)
*B60R 25/20* (2013.01)
*H04L 67/125* (2022.01)

(52) U.S. Cl.
CPC .......... *B60R 25/209* (2013.01); *B60R 25/102* (2013.01); *B60R 25/34* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 4,958,548 A * | 9/1990 | Schulze | B21D 28/002 91/392 |
| 5,990,800 A | 11/1999 | Tamaki et al. | |
| 9,193,353 B2 * | 11/2015 | Otanez | B60W 10/06 |
| 10,018,171 B1 * | 7/2018 | Breiner | F02N 11/0818 |
| 10,132,259 B1 | 11/2018 | Watson et al. | |
| 10,414,513 B2 | 9/2019 | Danielson et al. | |
| 2011/0256981 A1 * | 10/2011 | Saito | B60W 30/192 477/183 |
| 2021/0025144 A1 | 1/2021 | Lehmann et al. | |
| 2021/0231090 A1 * | 7/2021 | Katoh | B60R 16/03 |

FOREIGN PATENT DOCUMENTS

| | | | |
|---|---|---|---|
| GB | 2506134 A * | 3/2014 | F01M 5/02 |
| GB | 2506134 A1 | 3/2014 | |

OTHER PUBLICATIONS

Extended European Search Report and Written Opinion issued in European Patent Application No. 23151341.7, dated May 30, 2023, in 08 pages.

\* cited by examiner

*Primary Examiner* — Todd Melton
*Assistant Examiner* — Sarah A. Mueller

(57) ABSTRACT

A remote start system and method for a work machine wherein the system comprises a communication device, an engine starter subsystem, a fluid pressure sensor, and a controller. In a first step, controller receives a wake signal from the communication device, The controller then confirms the lock status of a safety lock on the work machine and outputs an engine start signal to the engine starter subsystem upon confirming the lock status. The controller then receives a fluid pressure signal from the fluid pressure sensor, and outputs an engine stop signal if the fluid pressure signal is below a predetermined threshold after a specified timeframe.

24 Claims, 3 Drawing Sheets

REMOTE START SYSTEM AND METHOD FOR A WORK MACHINE

CROSS-REFERENCE TO RELATED APPLICATIONS

Field of the Disclosure

The present disclosure relates to system and method of remotely starting a work machine.

Background

In the construction, agriculture, mining, and forestry industries, many different types of work machines operate to perform different tasks in a varying work environments. This includes off-road and on-road, high and low altitudes, and extreme temperature ranges. In some instances, starting the work machine at the beginning of a work shift may result in delays, for example, to properly warm the work machine. Variations in environmental conditions can impact how fluids respond in starting up the work machine. Current methods may use fluid level sensors. However, this can be misleading as levels may be impacted by changes in slope. Furthermore, current methods require starting the prime mover to run on idle for several minutes prior to confirming readiness. However, this can lead to unnecessary stresses on the work machine if a leak, insufficient fluid levels, or a hose for attachments is improperly coupled to the work machine. Therein lies an opportunity to shorten the timeframe for work machine readiness.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure relates to a system and method of remotely starting a work machine. The remote start system comprises a communication device, an engine starter subsystem, at least one fluid pressure sensor, and a controller. The communication device is configured to receive a remote start signal and outputs a wake signal upon receiving the remote start signal. The engine starter subsystem is configured to initiate an engine start. The fluid pressure sensor senses the fluid pressure on the work machine subsystem. The controller has a non-transitory computer readable medium with a program instruction to remotely start the work machine. The program instructions, when executed, cause the processor of the controller to do the following steps. The controller receives the wake signal; confirms a lock status of the safety lock of the work machine; outputs an engine start signal to the engine starter subsystem upon confirming the lock status; receives a fluid pressure signal from the fluid pressure sensor; and outputs an engine stop signal if the fluid pressure signal is below a predetermined threshold after a specified timeframe. The work machine subsystem comprises one or more of the hydraulic system and the transmission system.

The specified timeframe is at least 15 seconds. The specified timeframe may be variable and compensates for one or more of an ambient temperature and an altitude. The predetermined threshold is variable by compensating for one or more of an ambient temperature and an altitude.

The safety lock may comprise one or more of an engine hood lock, a service door lock, and a cab position lock. The communication device may send an alert signal to a remote user interface if the controller fails to confirm the lock status of the safety lock.

The communication device may send an alert signal to a remote user interface if the controller outputs an engine stop signal. The communication device may send an alert signal to a remote user interface if the controller outputs an engine start signal. The controller may receive the fluid pressure signal upon the engine reaching a minimum idle speed.

According to an aspect of the present disclosure, a method of remotely starting a work machine comprises the following steps. In a first step, a remote start signal is received by a communication device from a remote device. Next, the communication device outputs a wake signal upon receiving the remote start signal. The controller then receives the wake signal and confirms a lock status of a safety lock on the work machine. Next the controller outputs an engine start signal to the start subsystem upon confirming the lock status, monitors a fluid pressure signal from a fluid pressure sensor, and outputs an engine stop signal if the fluid pressure signal is below a predetermined threshold after a specified timeframe.

Other features and aspects of the disclosure will become apparent by consideration of the following detailed description and accompanying drawings.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The term "processor" is described and shown as a single processor. However, two or more processors can be used according to particular needs, desires, or particular implementations of the controller and the described functionality. The processor may be a component of the controller, a portion of the object detector, or alternatively a part of another device. Generally, the processor can execute instructions and can manipulate data to perform the operations of the controller, including operations using algorithms, methods, functions, processes, flows, and procedures as described in the present disclosure.

Figure 1:
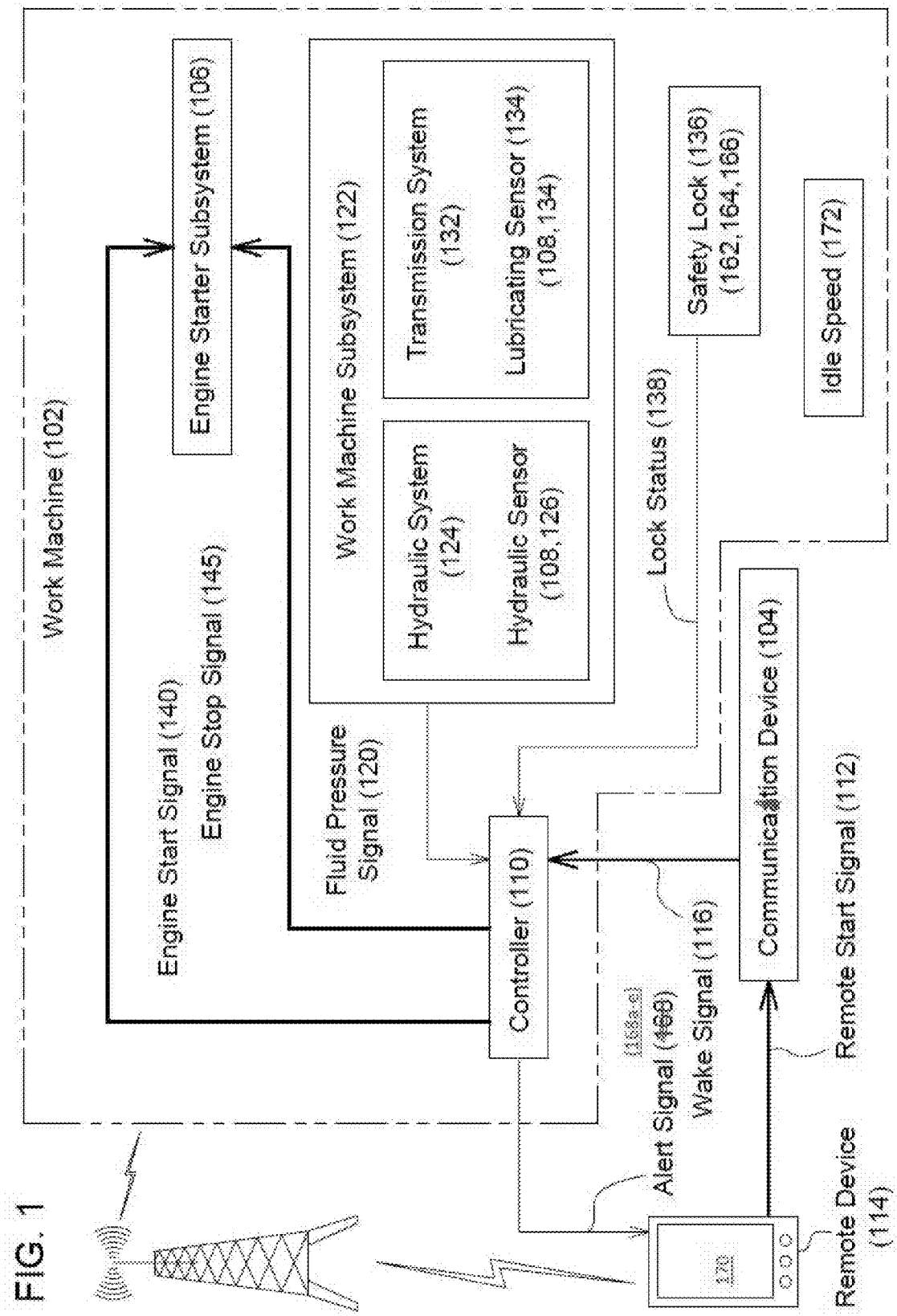
FIG. 1 is schematic representation of an exemplary remote start system.

FIG. 1 is a schematic representation of the remote start system 100 for a work machine 102 as applied to a compact track loader. However, the system 100 can be applied to any work machine, including but not limited to, various construction, forestry, mining and agricultural work machines.

The remote start system 100 comprises a communication device 104, an engine starter subsystem 106, at least one fluid pressure sensor 108, and a controller 110. The communication device 104 is configured to receive a remote start signal 112 from a remote device 114. The remote device 114 may generally be associated with a future operator of the work machine located at a location remote from the work machine 102, or alternatively the remote device 114 may autonomously run through program instructions to safely remote start the work machine 102. Although not shown in detail, the remote device 114 may include a tablet computing device, a smart cellular phone, personal digital assistant, a laptop computing device, for example. In another scenario, the remote device 114 may be stationary, such as a terminal, or otherwise be located at a control center.

The communication device 104 outputs a wake signal upon receiving a remote start signal 112 from the remote device 114. The remote device 114 may communicate with the communication device 104 over a network. For example, the remote device 104 may achieve bi-directional communications with the work machine 102, and/or the communication device 104 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the remote device 104 may include a Bluetooth® transceiver, a radio transceiver, a cellular transceiver, an LTE transceiver and/or a Wi-Fi transceiver. The remote device 114 may employ various security protocols and techniques to ensure that appropriately secure communication with the work machine and/or communication device 104, of the remote start system 100. In another embodiment, the work machine 102 may include a GPS or other navigation system. The GPS may be used to determine the location of the work machine. The GPS may also receive data or information from the remote device 114 in order to determine the location and direction of travel of the remote device 114 relative to the communication device 104 on the work machine 102. The communication device 104 may be configured to determine the exact or approximate distance between the communication device 104 and the remote device 114 and only initiate a wake signal 116 upon the remote device 114 being in an acceptable range.

The engine starter subsystem 106 is configured to initiate an engine start. The engine start subsystem 106 may alternatively be configured to energize any form of a prime mover, such as internal combustion engines, fuel cells, gas turbines, electric motors, etc.

The fluid pressure sensor 108 senses a fluid pressure 120 on a work machine subsystem 122. Work machine subsystems 122 may include a hydraulic system 124 and a transmission system 132. Various sensors on the work machine may measure the pressure, temperature, or the viscosity of the fluids within the work machine 102. The data acquired from measuring the multiple parameters is sent to the controller 110 for processing and monitoring. It is contemplated that the controller 110 may monitor the plurality of parameters of the fluids at one or more locations of the fluid paths. For example the hydraulic fluid pressure 125 may be measured with a hydraulic pressure sensor 126 at the outlet of the hydraulic pump or at the control valve etc. Similarly, the lubricating fluid pressure 133 may be measured with a lubricating pressure sensor 134 located at the exit of lubrication pump, in the lubricating supply lines or at any other appropriate location.

The controller 110 has a non-transitory computer readable medium that includes program instructions to remotely start the work machine. The program instructions when executed cause a processor of the controller 110 to receive the wake signal 116, confirm a lock status 138 of a safety lock 136 on the work machine 102, output an engine start signal 140 to the engine starter subsystem 106 upon confirming the lock status 138, receive a fluid pressure signal 120 from the fluid pressure sensor 108, and output an engine stop signal 145 if the fluid pressure signal 120 is below a predetermined threshold after a specified timeframe 155.

Figure 2:
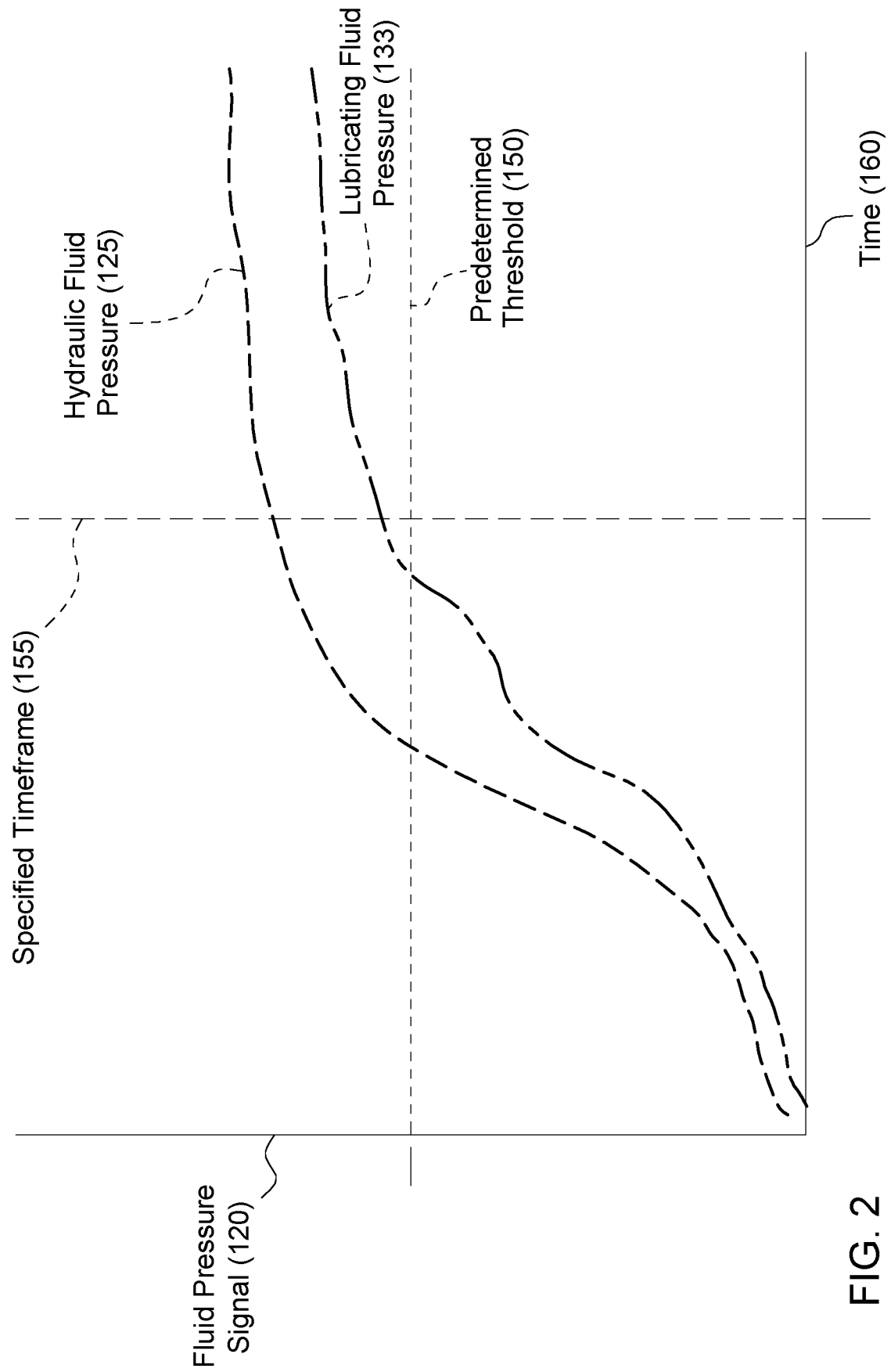
FIG. 2 is a graph illustrating monitoring of various fluid pressures over time.

Now referring to FIG. 2 with continued reference to FIG. 1, an exemplary graph 156 of the fluid pressure signal 120 over time 160 is shown. The specified timeframe is at least 15 seconds (as indicated by the vertical dotted line). The specified timeframe 155 may be variable wherein the timeframe 155 is compensated for either the ambient temperature, an altitude, or both. Work machines can operate in temperature extremes wherein both high and low temperatures can affect the performance of hydraulic and lubricating fluids. Cold temperatures can affect the viscosity of the fluids in a hydraulic system. Lower temperatures may increase the viscosity of hydraulic fluid and oil wherein the fluids behave as a thicker fluid. If the ambient temperature or work machine temperature impacts the viscosity substantially, the fluid will not behave as intended. For example, on startup, oil with higher-than-normal viscosity may not distribute evenly around critical components quickly enough to pressurize the system sufficiently. Therefore, in the exemplary scenario of cold temperatures, the specified timeframe 155 will lengthen. Similarly, low atmospheric pressure at high altitudes may subject the reservoir in hydraulic systems to insufficient pressure to supply the pump at rated flow conditions. In the exemplary scenario of high altitudes, the specified timeframe 155 will lengthen to allow for hydraulic fluid and oil to flow normally. In the same way, the predetermined threshold 150 may be variable by compensating for either the ambient temperature, an altitude, or both.

The safety lock 136 may comprise of one or more of an engine hood lock 162, a service door lock 164, and a cab position lock 166. Safety lock configurations will vary based on the work machine. For example, in the present embodiment of a compact track loader, the boom arms must be secured in a lowered position prior to starting the work machine 102. Furthermore, a remote operator will not have direct visibility of personnel being in or around the work machine during instances such as repair, workers being present, or individuals trespassing. Furthermore, a remote operator may not be able to determine if the work machine was tampered with. The safety lock check will verify if service doors, engine hoods, and panels are in a locked or secured position. This may be verified by sensors. Alternatively, this may be verified by an onboard image system or other methods of confirmation. The remote start process may only continue to proceed if the conditions are satisfied. If the controller 110 determines that a requirement is not met, the controller 110 may halt the process of remote starting and notify the communication device 104.

The communication device 104 may then send an alert signal to a remote user interface 170 if the controller 110 fails to confirm the lock status 138 of the safety lock 136. Alert signals 168 may include light indicators 168*a*, text messages 168*b*, audio calls 168*c*, digital pictorials 168*d* and a camera view 168*e*, for example.

The communication device 104 sends an alert signal 168 to a remote user interface 170 on a remote device 114 if the controller 110 outputs an engine start signal 140.

The controller 110 may further initiate monitoring the fluid pressure 120 upon the engine reaching a minimum idle speed 172.

Figure 3:
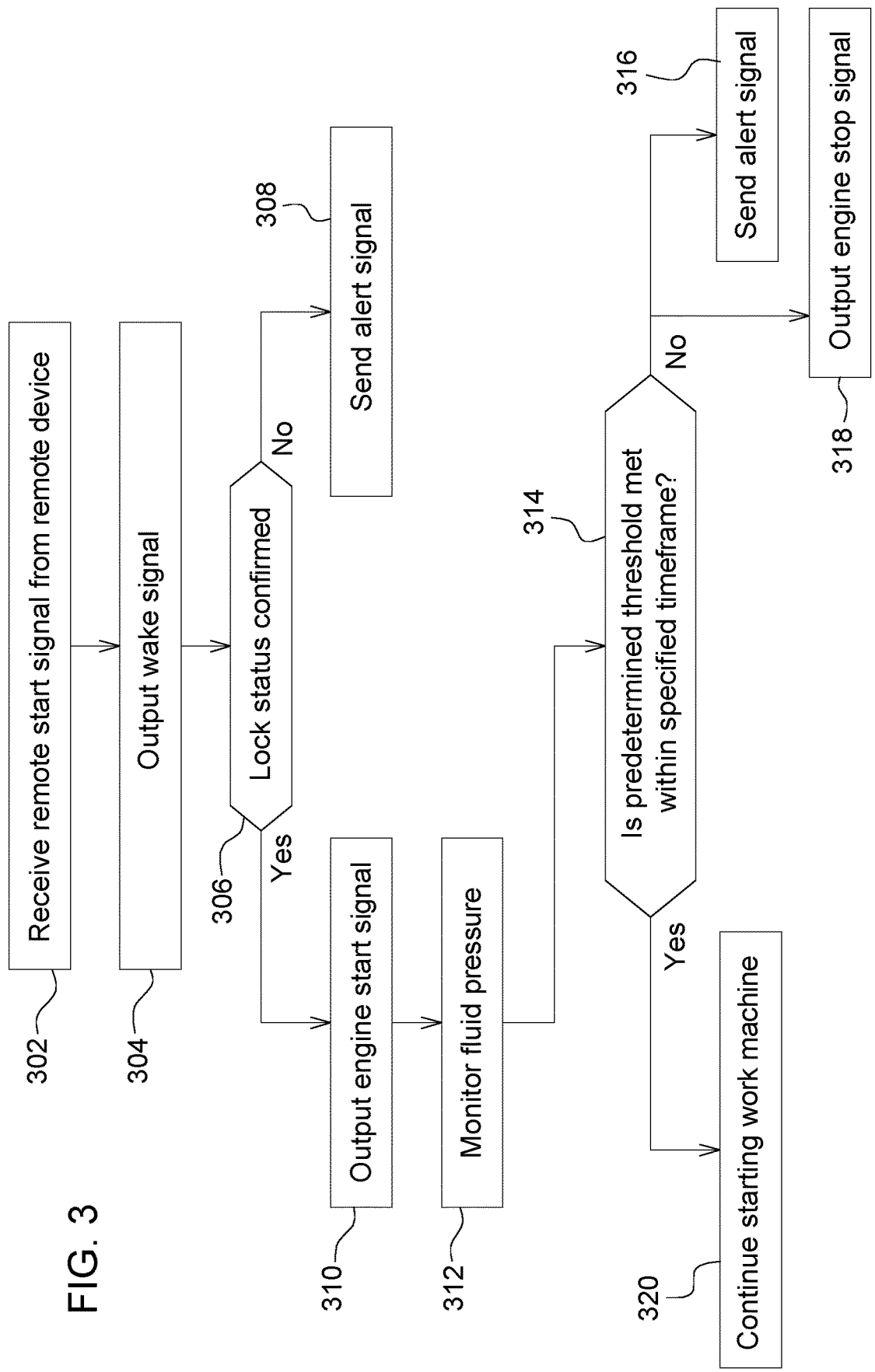
FIG. 3 is a flowchart outlining a method of remotely starting a work machine.

FIG. 3 discloses a method 300 of remotely starting a work machine. In a first step 302, the communication device 104 receives a remote start signal 112 from the remote device 114. The remote start signal 112 may be operator initiated, responsive to a timed program instruction, dependent on specific conditions (e.g. the distance between the remote device and the communication device), and part of a sequence of events in a worksite plan. In step 304, the communication device 104 outputs a wake signal upon 116 receiving the remote start signal 112. Once the wake signal 116 is received, in step 306, the controller 110 confirms a lock status 138 of one or more safety locks 136 on the work machine 102. In step 308, if the controller 110 fails to confirm the lock status 138, an alert signal 168 may be sent to a remote user interface 170 on the remote device 114. Alternatively, if the lock status 138 is confirmed, in step 310 the controller 110 outputs an engine start signal 140 to the engine starter subsystem 106, and thereby initiating an engine start. The controller, in step 312, then monitors fluid pressure signal 120 from the fluid pressure sensor 108 from one or more work machine subsystems 122. In step 314, if the fluid pressure signal 120 remains below a predetermined threshold 150 after a specified timeframe 155, the controller 110 will output an engine stop signal 145, and subsequently send an alert signal 168 to a remote user interface 170 on the remote device 114 in step 314. In a first embodiment, the predetermined threshold 150 of the pressure for a fluid is pre-established. This predetermined threshold value may depend on one or more of a fluid type, work machine subsystem 122 and the type of work machine 102. For example, the hydraulic fluid of the hydraulic system 124 may have a first threshold pressure and the lubricating fluid from a transmission system 132 may have a second threshold pressure different than the first threshold pressure. The predetermined threshold values for each fluid are stored in the controller memory. It is contemplated that the threshold pressure value could defined by a percentage of initial pressure of the fluid or defined by absolute pressure values.

The first specified timeframe 155 may be defined as the time elapsed after the controller 110 detects the engine start and could be predetermined based on the type of work machine subsystems 122, type of fluids used and type of the work machine 102. The first specified timeframe 155 may be stored in the controller memory and could be changed via the operator display or the remote device. In step 316, the communication device 104 sends an alert signal to a remote user interface if the controller outputs an engine stop signal as shown in step 318. Alternatively, as shown in step 320, the controller 110 may continue starting the work machine 102.

Various features of the disclosure are set forth in the following claims.

What is claimed is:

1. A remote start system of a work machine, the work machine comprising an engine, the remote start system comprising:
   a communication device configured to receive a remote start signal from a remote device, the communication device outputting a wake signal upon receiving the remote start signal;
   an engine starter subsystem configured to initiate an engine start;
   a first fluid pressure sensor for sensing a first fluid pressure on a first work machine subsystem;
   a second fluid pressure sensor for sensing a second fluid pressure on a second work machine subsystem; and
   a controller having a non-transitory computer readable medium with a program instruction to remotely start the work machine, the program instructions when executed causing a processor of the controller to:
   receive the wake signal;
   once the wake signal is received, confirm a lock status of a safety lock of the work machine, to initiate the engine start;
   output an engine start signal to the engine starter subsystem upon confirming the lock status;
   receive a first fluid pressure signal from the first fluid pressure sensor and a second fluid pressure signal from the second fluid pressure sensor after the engine start; and
   output an engine stop signal if one of the first fluid pressure signal is below a first predetermined threshold and the second fluid pressure signal is below a second predetermined threshold after a specified timeframe.

2. The remote start system of claim 1, wherein the first work machine subsystem and the second work machine subsystem each comprises one or more of a hydraulic system and a transmission system.

3. The remote start system of claim 1, wherein the specified timeframe is at least 15 seconds.

4. The remote start system of claim 1, wherein the specified timeframe is variable and compensates for one or more of an ambient temperature and an altitude.

5. The remote start system of claim 1, wherein one or more of the first predetermined threshold and the second predetermined threshold is variable by compensating for one or more of an ambient temperature and an altitude.

6. The remote start system of claim 1, wherein the safety lock comprises one or more of an engine hood lock, service door lock, and a cab position lock.

7. The remote start system of claim 1, wherein the communication device sends an alert signal to a remote user interface if the controller fails to confirm the lock status of the safety lock.

8. The remote start system of claim 1, wherein the communication device sends an alert signal to a remote user interface if the controller outputs the engine stop signal.

9. The remote start system of claim 1, wherein the communication device sends an alert signal to a remote user interface if the controller outputs the engine start signal.

10. The remote start system of claim 1, wherein the controller receives one or more of the first fluid pressure signal and the second fluid pressure signal upon the engine reaching a minimum idle speed.

11. The remote start system of claim 1, wherein at least one of the first predetermined threshold and the second predetermined threshold is defined as a percentage of initial fluid pressure.

12. The remote start system of claim 1, wherein the specified timeframe is dependent on one of a sequence of events in a worksite plan, a machine type and a distance between the remote device and the controller on the work machine.

13. A method of remotely starting a work machine, the work machine comprising an engine, the method comprising:
receiving a remote start signal by a communication device from a remote device;
outputting a wake signal by the communication device upon receiving the remote start signal;
receiving the wake signal by a controller;
once the wake signal is received confirming a lock status by the controller of a safety lock of the work machine;
outputting an engine start signal to an engine starter subsystem upon confirming the lock status to initiate the engine start;
monitoring a first fluid pressure signal from a first fluid pressure sensor and a second fluid pressure signal from a second fluid pressure sensor after the engine start, the first fluid pressure sensor sensing a first fluid pressure on a first work machine subsystem and the second fluid pressure sensor sensing a second fluid pressure one a second work machine subsystem; and
outputting an engine stop signal if one of the first fluid pressure signal is below a first predetermined threshold and the second fluid pressure signal is below a second predetermined threshold after a specified timeframe.

14. The method of remotely starting a work machine of claim 13, wherein the first work machine subsystem and the second work machine subsystem each comprises one or more of a hydraulic system and a transmission system.

15. The method of remotely starting a work machine of claim 13, wherein the specified timeframe is at least 15 seconds.

16. The method of remotely starting a work machine of claim 13, wherein the specified timeframe is variable by compensating for one or more of an ambient temperature and an altitude.

17. The method of remotely starting a work machine of claim 13, wherein one or more of the first predetermined threshold and the second predetermined threshold is variable and compensating for one or more of an ambient temperature and an altitude.

18. The method of remotely starting a work machine of claim 13, wherein the safety lock comprises one or more of an engine hood lock, service door lock, and a cab position lock.

19. The method of remotely starting a work machine of claim 13, wherein the communication device sends an alert signal to a remote user interface and outputs an engine stop signal if the controller fails to confirm the lock status of the safety lock.

20. The method of remotely starting a work machine of claim 13, wherein the communication device sends an alert signal to a remote user interface if the controller outputs the engine stop signal.

21. The method of remotely starting a work machine of claim 13, wherein the communication device sends an alert signal to a remote user interface if the controller outputs the engine start signal.

22. The method of remotely starting a work machine of claim 13, wherein the controller receives one or more of the first fluid pressure signal and the second fluid pressure signal upon the engine reaching a minimum idle speed.

23. The method of remotely starting a work machine of claim 13, wherein at least one of the first predetermined threshold and the second predetermined threshold is defined as a percentage of initial fluid pressure.

24. The method of remotely starting a work machine of claim 13, wherein the specified timeframe is dependent on one of a sequence of events in a worksite plan, a machine type and a distance between the remote device and the controller on the work machine.

\* \* \* \* \*